United States Patent [19]

Schneider et al.

[11] Patent Number: 4,495,071
[45] Date of Patent: Jan. 22, 1985

[54] HORIZONTAL PLATE FILTER WITH SELF-ALIGNING PLATES

[75] Inventors: John R. Schneider, 26 Cove Rd., Belvedere, Calif. 94920; Joseph F. Mangione, San Rafael, Calif.

[73] Assignee: John R. Schneider, Belvedere, Calif.

[21] Appl. No.: 478,313

[22] Filed: Mar. 24, 1983

[51] Int. Cl.³ ............................................. B01D 25/04
[52] U.S. Cl. .................................... 210/230; 210/231; 210/236; 100/199
[58] Field of Search ............... 210/225, 230, 231, 236; 100/199, 200, 258 A

[56] References Cited

U.S. PATENT DOCUMENTS 3,608,734  9/1971  Schneider ........................... 210/387
3,690,462  9/1972  Kurita .................................. 210/225

FOREIGN PATENT DOCUMENTS 1082728  11/1960  Fed. Rep. of Germany ...... 100/199

Primary Examiner—Ivars Cintins
Assistant Examiner—W. Gary Jones
Attorney, Agent, or Firm—Owen, Wickersham & Erickson, P. C.

[57] ABSTRACT

A liquid filtering apparatus comprises upper and lower platens and a plurality of intermediate plate members between the platens. When pressed together with a sheet of filter media between each pair of adjacent plates, a fluid-tight chamber for incoming liquid to be filtered is formed on one side of the filter media. When the filter media requires replacement, the upper platen is lifted to separate the plates. Each plate is provided with combined alignment and stop means so that when the plates are again brought together after renewal of the filter media, they will automatically resume their normal stacked position in proper alignment, the stop means also providing a preselected amount of space between adjacent plates to cause a desired amount of compression for a sealing member between the plates. The alignment and stop means is designed to absorb the compression load on the plates, thereby enabling them to be made of lighter metal or plastic materials without overstressing their side walls.

11 Claims, 15 Drawing Figures

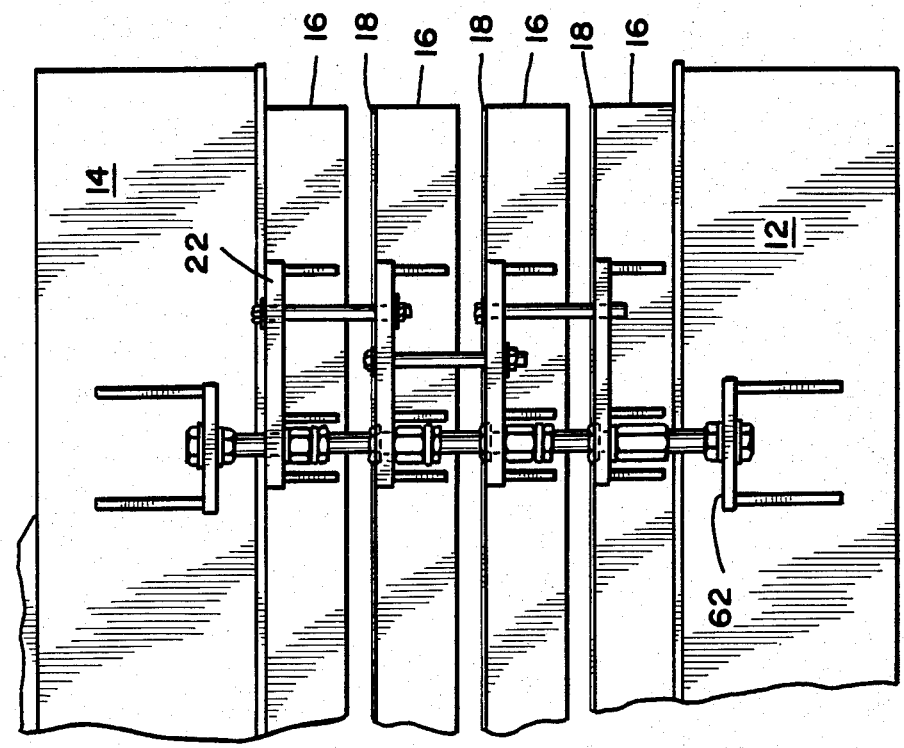
FIG_1A
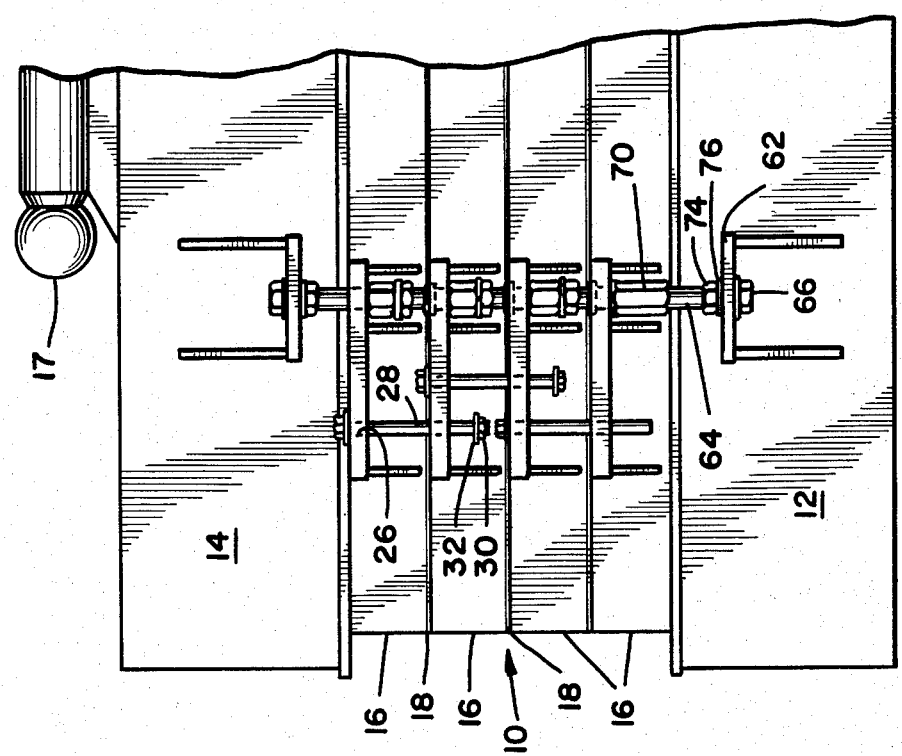
FIG_1B

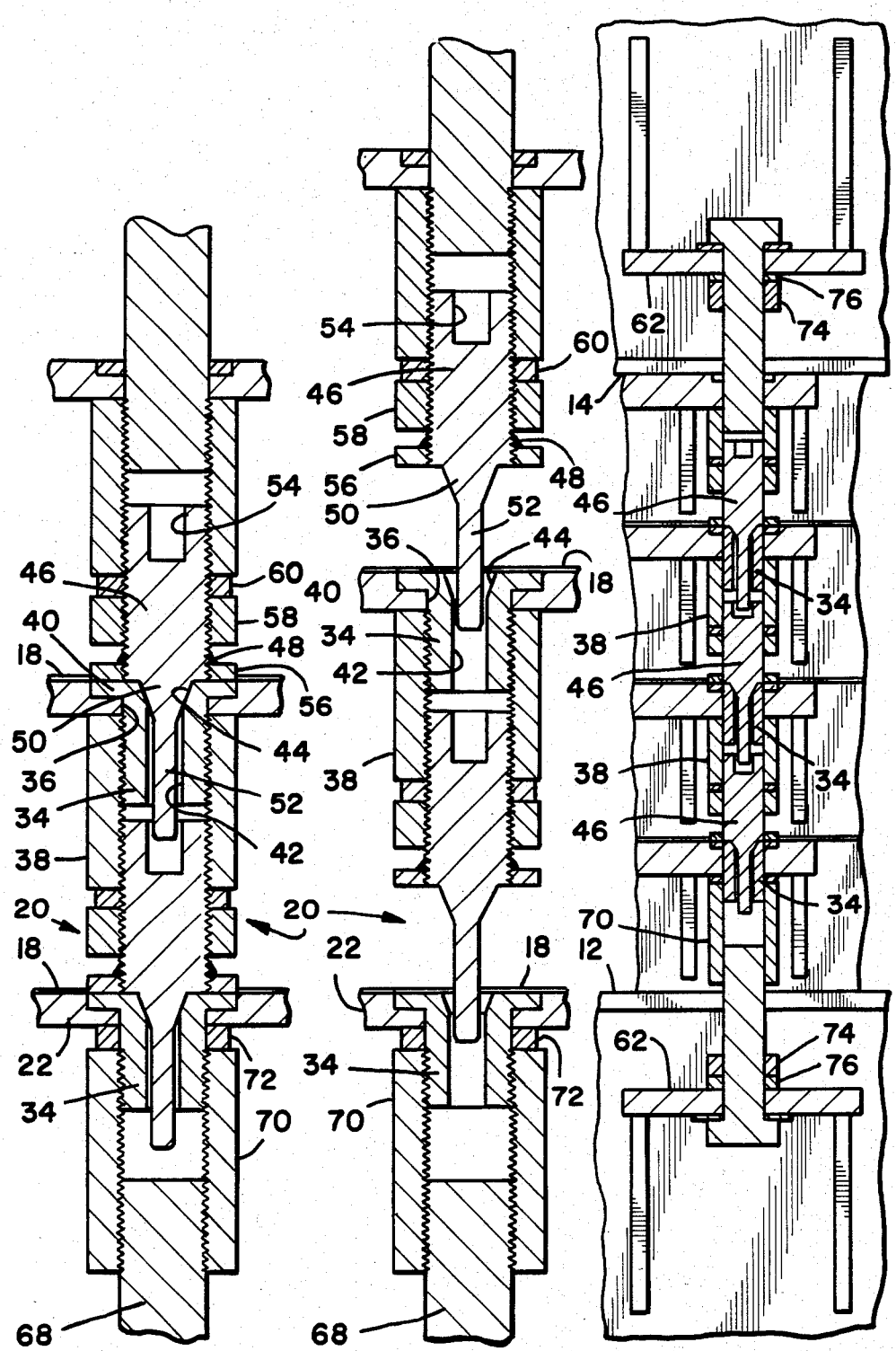
FIG_2A  FIG_2B  FIG_2C

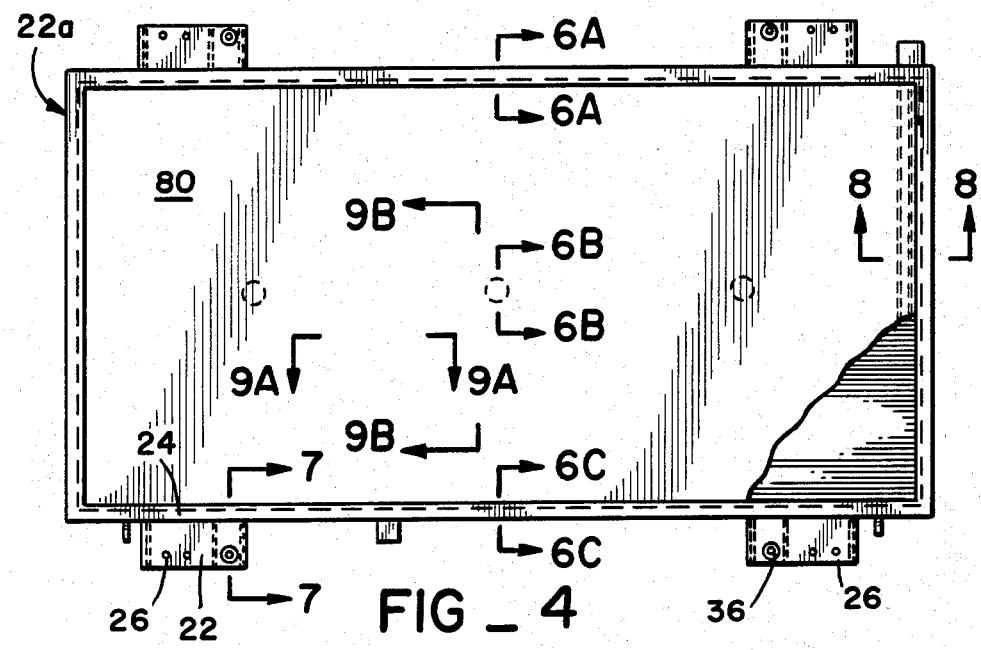
FIG_4
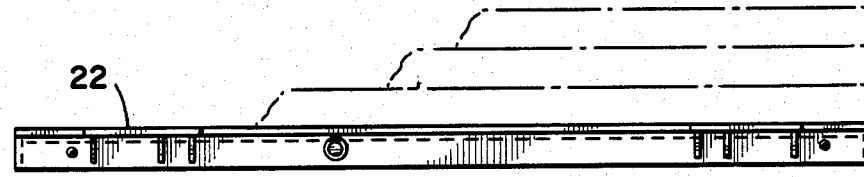
FIG_3
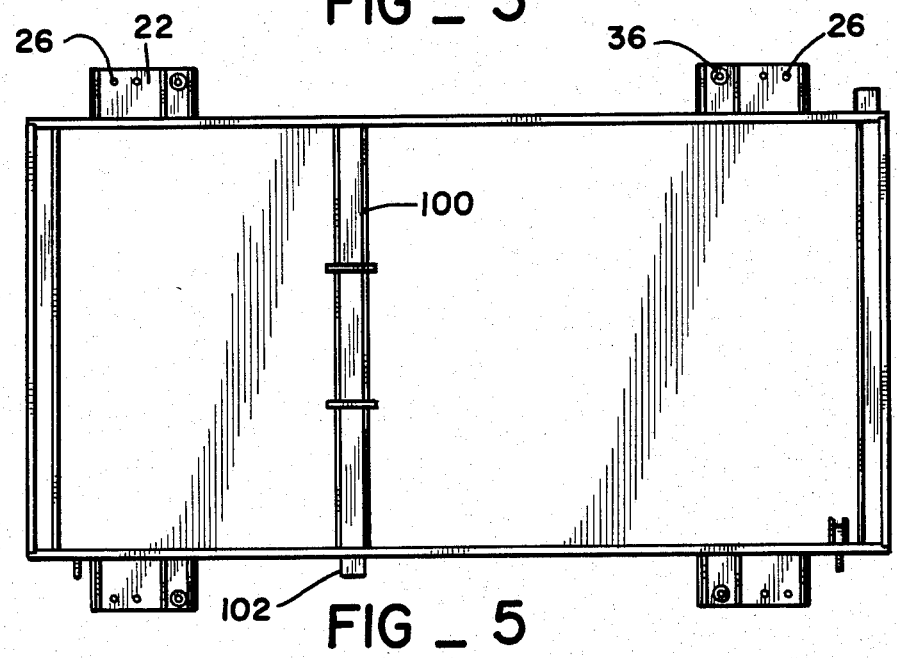
FIG_5

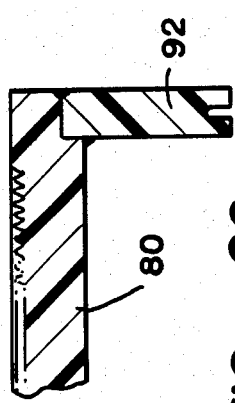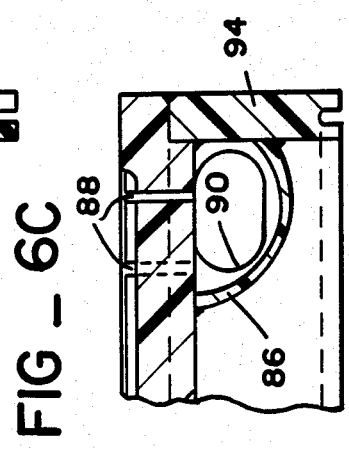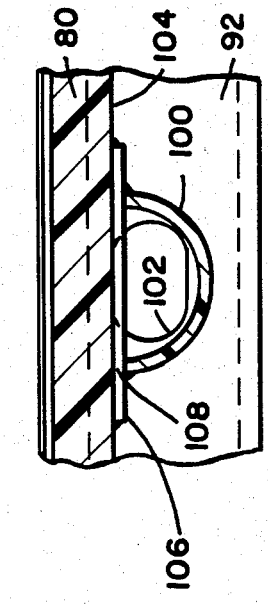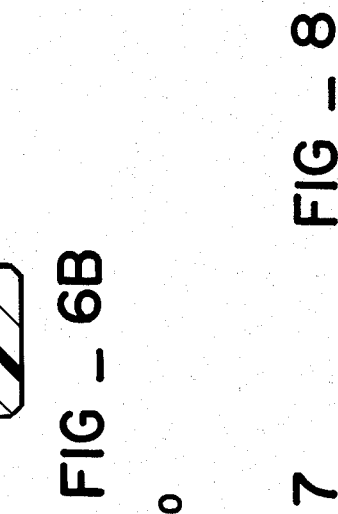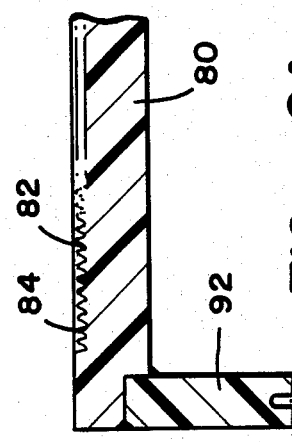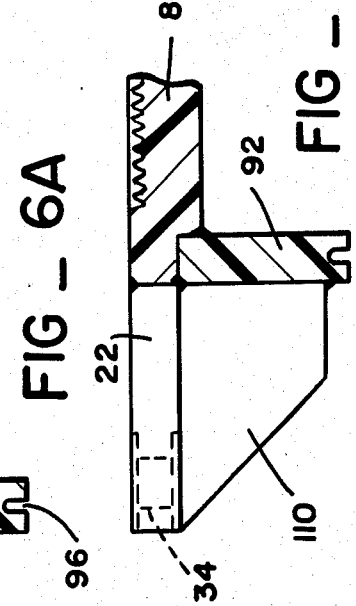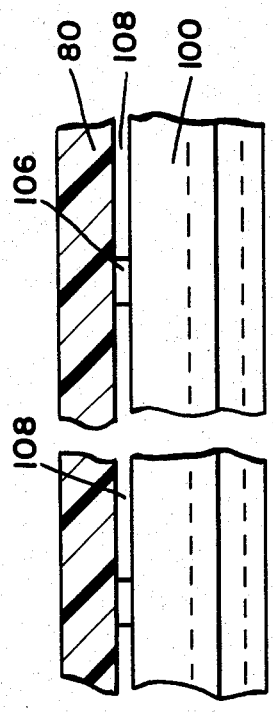

HORIZONTAL PLATE FILTER WITH SELF-ALIGNING PLATES

This invention relates to liquid filtering apparatus and more particularly to an improved horizontal plate type filter.

BACKGROUND OF THE INVENTION

As described in my U.S. Pat. No. 3,608,734, a highly successful form of liquid filtering apparatus is comprised of a plurality of horizontal plates which are arranged in a vertical stack. The plates are shaped with side walls and transverse portions that form enclosed cavities or chambers when they are pressed together. With a sheet of filter media located between each pair of adjacent plates, a chamber for incoming unfiltered liquid is formed on the upper side of the sheet, with a cavity for the filtered liquid below the sheet. When necessary, the plates are separated by being moved upwardly to allow fresh sheets of filter media to be positioned between plates, and when thus positioned, the plates are brought together by a vertically directed force sufficient to seal the peripheries of the plates and thus form the aforesaid liquid-tight chambers and for dirty and clean liquid on opposite sides of each filter media sheet. In order to adequately seal the plates as they are closed at the end of each media changing cycle, the vertical force exerted must not only be sufficient, but it is also essential that adjacent plates of an entire stack be maintained in perfect alignment relative to each other so that their sealing elements function properly. Maintaining such proper alignment has heretofore been a problem because often the plates become misaligned as they are lifted and separated. Consequently, when the plates were again pressed together after the filter media was changed, it was often difficult to achieve an adequate seal without using excessive closing force on the plates because there was no assurance that each plate would align itself exactly in the same position for proper sealing each time.

The requirement for a relatively large vertical closing force created a related problem in that, under certain circumstances, it caused excessive loads to be exerted on structural elements of the plates, such as their side walls. This became particularly critical when the plates were constructed from a plastic material instead of a stronger metal for filters which must be capable of handling corrosive liquids.

It is, therefore, one object of the present invention to overcome the aforesaid problems by providing a means for maintaining the proper alignment of a plurality of plates in a horizontal plate type filter as the plates are repeatedly separated and then closed to facilitate the advancement of filter media between pairs of adjacent plates.

Another object of the present invention is to provide an improved plate for a horizontal plate type filter that enables it to be more readily aligned and sealed with adjacent plates when the plates are pushed together.

Yet another object of the invention is to provide for the alignment of vertically separable and closeable plates in horizontal plate filter that also includes stop means for limiting the contact pressure between adjacent plates and thus, the stress on the plate as the side walls are closed together.

Another object of the invention is to provide an improved filter plate for horizontal plate-type filtering device that may be fabricated from nonmetallic, noncorrosive plastic materials.

A further object of the present invention is to provide an improved filter plate with alignment and stop means which is particularly well adapted for ease and economy of manufacture.

SUMMARY OF THE INVENTION

The aforesaid and other objects of the invention are accomplished by a unique assembly of structural elements mounted on each of a series of filter plates for a horizontal plate filter. Generally, each filter plate has a plurality of projections or ears, each having a tapered bushing seated within one end of a tubular coupling nut and a tapered pin at its other end. The pin of one plate is aligned with and is designed to interact with the tapered bushing of the adjacent plate to provide precise alignment of the plates as they are brought together by a vertically movable jack or the like. The pin also has an adjustable nut portion that serves as a stop and is adapted to control a particular clearance between plates as they are pressed together so that pressure on an elastomeric seal between the plates will not be excessive, and the vertical load exerted by the plate closing means of the filter is taken by the stop means and not the side walls of the filter plates.

Other objects, advantages and features of the invention will become apparent from the following detailed description of one embodiment thereof presented in conjunction with the accompanying drawing.

BRIEF DESCRIPTION OF THE DRAWING

FIG. 1A is a fragmentary view in elevation showing one end of a horizontal plate filter according to the invention, with the plates closed;

FIG. 1B is a fragmentary view in elevation showing the other end of the plate filter of FIG. 1A, with the plates in the separated, opening position;

FIG. 2A is a fragmentary view in elevation and in section showing the alignment elements for the filter plates of FIG. 1A;

FIG. 2B is a fragmentary view in elevation and in section showing the alignment elements for the filter plates in the separated position depicted in FIG. 1B;

FIG. 2C is a view in elevation and in section of one full chain of alignment stop means according to the invention, with the plates in their closed position;

FIG. 3 is a view in side elevation of a single filter plate embodying principles of the present invention;

FIG. 4 is a top view of the filter plate of FIG. 3 with additional plates shown in phantom;

FIG. 5 is a bottom view of the filter plate of FIG. 3 with additional plates shown in phantom; and FIGS. 6A, 6B, 6C, 7, 8, 9A and 9B, are views in section taken along lines 6A, 6B, 6C, 7, 8, 9A and 9B, respectively, of FIG. 4.

DETAILED DESCRIPTION OF EMBODIMENT

With reference to the drawing, FIGS. 1A and 1B show the filtering section of a horizontal plate filter 10, with plates and alignment means therefor, embodying principles of the present invention. Generally, the filter, which is used to high rates of liquid flow for various industrial applications, comprises a lower platen 12, an upper platen 14 and a series of intermediate plates 16. In the example shown, four intermediate plates are provided, but any desired number of plates can be used, depending on the particular design of the filter and the type of filtering service it will be expected to provide. On such a filter, the upper platen is connected to a suitable lifting means such as an electrically powered jack 17, shown diagrammatically but described in greater detail in U.S. Pat. No. 3,608,734. When the lifting means is actuated, the upper platen is raised, together with all of the intermediate plates, so that the plates become separated and used filter media (not shown) between them can be advanced and removed and fresh filter media, such as a special form of filter paper, positioned between the plates. When this is accomplished, the lifting means is reversed to force the plates together and compress a rectangular seal 18 located around the edges of each sheet of filter media. The seal may be made of a suitable material that is resiliently compressible, such as a plastic material that is also resistant to caustic chemicals, (e.g. polyurethane). Once the plates are sealed, a series of intake chambers for dirty liquid to be filtered is formed above each sheet of filter media and an outlet chamber for clean liquid is formed below each sheet. Appropriate conduits (not shown) are provided to supply dirty liquid to the intake chambers and to remove clean liquid from the outlet chambers. In FIG. 1A, the filter 10 is shown in its normal operating position with the plates 16 closed against their seals 18, and in FIG. 1B, the plates are shown separated for advancing the filter media.

In accordance with one important feature of the invention, a series of alignment pin assemblies 20 are provided to interconnect the platens 12 and 14 with the intermediate plates 16. During the separation and closing of the plates by the lifting jack, they control the alignment of the plates to assure proper sealing and also, they serve as stop means to control the amount of compressive force on the seals 18 when the plates are closed. These alignment assemblies are supported by projections or ears 22 attached to the sides of each plate which is generally rectangular. These ears are made of a strong, rigid material and are either integral with or welded (or bonded) to the outer surface of each filter plate side wall. As shown in FIG. 4, each ear 22 is generally rectangular in planform with its longer side being parallel or adjacent to the filter plate side wall 24. Near one end of each ear is an opening 26 through which extends a lifting bolt 28 which also extends through an aligned opening in the ear of the plate below. At the lower end of each lifting bolt is an adjustable nut 30 and a washer 32. Thus, as shown in FIG. 1B, as the lifting means raises the upper platen 14, and the top intermediate plate 16, the lifting bolts 28 first allow the top two intermediate plates to separate, and then the washers 32 bear upon the underside of the ears 22 on the next lower plate to cause it to be raised also.

Spaced from the lifting bolts 28 on each ear of an intermediate plate and near the other end of the ear is an alignment pin assembly 20. As best seen in FIG. 2A, each alignment assembly comprises an alignment bushing 34 with a body portion which extends through an opening 36 in the ear and is threaded into the upper end of a tubular coupling nut 38 whose end is attached (as by welding or bonding) to the underside of the eear around the opening 36. The alignment bushing has an annular flange 40 at its upper end which is preferably recessed in the ear so as to lie flush with the upper surface of the ear. Extending axially through the alignment bushing is a smooth bore 42 having a conical surface 44 at its upper end which diverges to a larger opening diameter than the bore.

Now, threaded into the lower end of the coupling nut 38 is the threaded upper cylindrical end 46 of an aligning pin 48. Extending below this cylindrical upper end is a lower pin portion comprised of an intermediate conical portion 50 and a lower cylindrical shank portion 52. The conical pin portion is shaped to have the same degree of taper as the conical surface 44 in the alignment bushing 34, and the shank portion has a diameter which is somewhat less than the smooth bore 42, so that substantial clearance (e.g., 0.050 inches) between these parts is provided.

At the top end of the cylindrical upper portion 46 of the alignment pin is a bore hole 54 having a diameter equal to or somewhat greater than the bore 42 of the alignment bushing. As shown in FIG. 2A, the lower end of the alignment pin above fits easily within the bore holes 54 when the plates are together in the closed filter operating position. Fixed to the lower end of the cylindrical upper portion of each alignment stop pin is a hex-nut flange 56 which facilitates the ease of threading the alignment pin within the coupling nut, and thus, the adjustment of the seal clearance between plates. Between the latter flange 56 and the lower end of the coupling nut is provided a lock nut 58 with a washer 60 which is threaded to the pin upper portion and serves to retain the alignment pin in its preselected position relative to the coupling nut.

As shown in FIGS. 1A, and 1B, the lowermost plate is attached to the lower platen and the uppermost plate is attached to the upper platen by bolts which are axially aligned with the alignment assemblies 20 of the intermediate plates. Thus, on the lower platen a pair of brackets 62 are fixed on each side as by welding. Extending upwardly through each bracket is the shank of a bolt 64 whose head 66 is retained in the lower side of the bracket. The shank 68 of each bolt 64 is threaded into the lower end of an elongated coupling nut 70 whose upper end is threaded to an alignment bushing 34 of the lowermost intermediate plate. As shown in FIG. 2A, a washer 72 is provided between the upper end of the coupling nut 70 and the underside of the ear on the plate. A shorter lock nut 74 with a washer 76 is also threaded to the bolt 64 to hold it firmly on the bracket 62.

A similar arrangement is provided for connecting the top platen 14 to the uppermost plate.

By reference to FIG. 2C, the functional and structural features of the alignment and stop means can be summarized. First of all, the upper end 46 of each aligning pin 48 is threaded within its mating alignment bushing 34 by an amount which affords the desired clearance between plates when they are in the closed position. Thus, when the vertical force is applied to close the plates, the scale 18 between adjacent plates can be compressed by the optimum amount to provide adequate sealing. Yet, the compressive force applied is absorbed by the chain of alignment pins and bushings and not the side walls of the plates.

As mentioned above, for certain types of liquid filtering jobs wherein the liquid being filtered may have a highly corrosive characteristic, it is necessary to make the filter plates from a nonmetallic material. One example of such a requirement arose in the filtering of water used in operations for extracting oil from the ground. In such systems, water is forced into the ground at points surrounding an oil well to force the oil out. This water usually becomes contaminated with dirt as well as a variety of highly corrosive salts in the earth strata and must be filtered to a high level of purity before being recycled.

In FIGS. 3-9 are shown details of an intermediate plate 22a which is made of plastic materials and thus solves the problem of operating with highly corrosive liquids. As seen in FIGS. 3-5, this plate has a central, generally planar member 80 having a rectangular shape. The entire upper surface of this planar member from side to side is formed in a corrugated configuration with alternating, parallel grooves and ridges 82 and 84. The ridges are spaced close enough together (e.g. 0.2 inches) to support a sheet of flexible filter media and the adjacent grooves serve to receive filered liquid that passes through the media. Near one end of each plate, the grooves terminate above a transverse conduit 86 that extends at a right angle to the grooves on the underside of the planar member. As shown in FIG. 8, a pair of vertical passages 88 are provided in each groove which allow filtered liquid to flow into the conduit and thence through an outlet 90 in one side wall of the plate. The planar member, which may be made from a solid plastic sheet material such as urethane, is connected, as by bonding, to a pair of side walls 92 and a pair of end walls 94 which are in turn connected at their ends to form a fluid tight rectangular wall. The bottom edges of these walls are all preferably provided with a groove 96 adapted to cooperate with the resilient sealing member 18 when the plates are pinned together during filter operation. A centrally located post 98 is provided to give internal support to the central planar member. Extending transversely between opposite side walls, as shown in FIG. 5, is a channel member 100 having one end connected to the inside surface of one side wall 92 and its other end connected to an inlet opening 102 that extends through the opposite side wall. This channel member is spaced slightly below the underside surface 104 of the planar member by a pair of transverse spacer members 106. Thus, along both edges of the channel, member a pair of narrow inlet passages 108 are created that extend entirely across the planar member. This facilitates the even distribution of dirty liquid as it flows into the chamber above the filter media of the plate immediately below, and in so doing, it prevents the inrushing dirty liquid from disturbing the filter media.

The supporting ears 22 for the alignment assemblies are formed from blocks of solid plastic (e.g. polyurethane) that extend outwardly from the plate side walls. Each ear block is supported by supports 110 at opposite ends which are firmly attached to the underside of the ear block and the outer surface of the side wall.

In the plastic plate, as described, the various components are preferably prefabricated to the correct dimensions and then assembled by bonding them together with a plastic weld of the same material (e.g. a polyvinyl chloride weld). Since the main compressive load on the closed plates is taken up by the alignment/stop means, the strength of the plates, even when fabricated from lighter plastic material, is more than adequate.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

It is claimed:

1. In a liquid filtering device a filtering section comprising:

a lower platen;
   an upper platen;
   a plurality of intermediate filter plates located between said platens;
   means connecting said plates to each other with one of said plates being connected to said upper platen;
   sealing means between adjacent plates;
   means for moving said upper platen upwardly relative to said lower platen to separate said plates in oen operating mode to facilitate replacement of filter media between plates and for moving said upper platen downwardly in another operating mode to press said plates and said platens together and thereby seal chambers formed between adjacent plates for incoming liquid being filtered; and
   alignment means on each of said plates cooperating with similar alignment means on each adjacent plate for maintaining the precise positioning of said plates relative to each other as the plates are brought together, each said alignment means comprising a plurality of alignment pins for each said filter plate; means on each said filter plate for retaining said alignment pins;
   centering means on each alignment pin; and a receptacle means on each said filter plate for receiving said centering means of an alignment pin for an adjacent filter plate when the plates are moved together.

2. The filtering section as described in claim 1 wherein said retaining means on each said filter plate comprises a plurality of internally threaded members fixed to said filter plate and adapted to receive an upper threaded end of a said alignment pin so that the centering means and a lower portion of said pin projects from said threaded member and into a receptacle means of the adjacent plate below.

3. The filtering section as described in claim 1 wherein said centering means on each said alignment pin is a frusto-conical portion thereof intermediate between an enlarged threaded upper portion and a relatively smaller lower portion.

4. The filtering section as described in claim 1 wherein said receptacle means comprises a plurality of annular bushings fixed to each said filter plate, each bushing having internal threads and an upper tapered inlet with an internal shape similar to the external shape of the centering means of said alignment pins.

5. The filtering section as described in claim 1 wherein said retaining means includes structural ear members projecting from opposite sides of each said filter plate, each said ear supporting a saId receptacle means in the form of an annular bushing having a flange surrounding an inwardly converging inlet at its upper end connected to a body portion with a smooth central bore and external threads extending through and below the ear member; a supporting nut having an upper portion attached to said body portion, and a lower portion for receiving an upper threaded portion of a said alignment pin, whereby said alignment pins can all be adjusted within their respective supporting nuts to thereby control the spacing between filter plates in their closed position and thus, the amount of compression force on said sealing means.

6. The filtering section as described in claim 5 wherein each said filter plate comprises a central planar member with side walls and end walls and ear members projecting from said side walls all made of plastic material.

7. The filtering section as described in claim 6 wherein said planar member, side walls, end walls and ear members are welded together with a plastic weld material.

8. In a liquid filtering device of the type comprising a lower platen, an upper platen and at least one filter plate between said platens for supporting a disposable layer of filter media, there being a chamber formed above said layer of filter media with an inlet for receiving liquid to be filtered and means below said filter media for collecting filtered liquid and having an outlet, each said filter plate comprising:

a central planar member with side walls and end walls;

alignment means on said filter plate to facilitate its proper orientation with similar plates arranged in a stack for a filtering device;

ear members extending from said side walls for supporting said alignment means, said alignment means comprising:

a bushing member in each ear means having a lower portion with a central bore and an upper portion with a tapered inlet opening to said bore;

an alignment pin for each said bushing member, with an enlarged portion at one end and a smaller portion at its opposite end, said enlarged and smaller portions interconnected by a tapered conical portion adapted to fit within said tapered opening of said bushing member; a coupling means fixed to the underside of each said ear member and adapted to receive the lower portion of a said bushing member at its upper end and an enlarged portion of said pin at its lower end;

said enlarged portion of each said pin being thereby aligned with a bushing member of another plate directly above while said lower, smaller portion of each pin is axially movable within said central bore of a bushing member in the plate below, until said pin tapered portion is seated within said tapered opening of the bushing, thereby causing adjacent plates to maintain precise alignment and spacing when they are closed together.

9. The filter plate of claim 8 wherein each said coupling means is an internally threaded coupling nut and the upper portion of each said pin is adjustable axially within the nut to thereby control the clearance between closed, adjacent plates.

10. The filter plate of claim 8 wherein said planar member, said side walls, end walls and ear members are fabricated from solid plastic material secured together by plastic weldments.

11. In a liquid filtering device a filtering section comprising:

a lower platen;

an upper platen;

a plurality of intermediate filter plates located between said platens;

means connecting said plates to each other with one of said plates being connected to said upper platen;

sealing means between adjacent plates;

means for moving said upper platen upwardly relative to said lower platen to separate said plates in one operating mode to facilitate replacement of filter media between plates and for moving said upper platen downwardly in another operating mode to press said plates and said platens together and thereby seal chambers formed between adjacent plates for incoming liquid being filtered; and alignment means associated with adjacent plates for assuring the precise positioning of said plates relative to each other as the plates are brought together, including a plurality of tapered centering means cooperative between adjacent plates for urging the plates into precise vertical alignment.

* * * * *